United States Patent [19]

Coons et al.

[11] 3,874,306
[45] Apr. 1, 1975

[54] RAIL DRAFT VEHICLE
[75] Inventors: Harold L. Coons, Gladstone; Jack L. Highfill, Grandview, both of Mo.
[73] Assignee: ISCO Manufacturing Company, Inc., Kansas City, Mo.
[22] Filed: Feb. 21, 1974
[21] Appl. No.: 444,265

[52] U.S. Cl. .......................... 105/26 R, 105/215 C
[51] Int. Cl. ............................................. B61c 17/00
[58] Field of Search ............. 105/26 R, 26.1, 215 C

[56] References Cited
UNITED STATES PATENTS

| | | | |
|---|---|---|---|
| 3,228,350 | 1/1966 | Cox | 105/215 C |
| 3,249,067 | 5/1966 | Keller | 105/215 C |
| 3,633,514 | 1/1972 | Deike | 105/215 C X |
| 3,653,332 | 4/1972 | Olson et al. | 105/215 C |
| 3,701,323 | 10/1972 | Cox | 105/215 C |

*Primary Examiner*—Lloyd L. King
*Assistant Examiner*—John J. Love
*Attorney, Agent, or Firm*—Fishburn, Gold & Litman

[57] ABSTRACT

A draft vehicle for moving a plurality of freight cars on rails and trailers on highways includes a mobile vehicle and a frame therefor and front traction wheels and rear traction wheels mounted on the frame and operative to drive and steer the draft vehicle and the wheels of the front traction wheels and the wheels of the rear traction wheels are laterally spaced apart a distance suitable for traction engagement with a top portion of respective laterally spaced rails on which the draft vehicle is to be operated. The front traction wheels and the rear traction wheels are longitudinally spaced apart and positioned such that the weight of the mobile draft vehicle is substantially equally supported on the front traction wheels and the rear traction wheels. Front and rear flanged metal guide wheels are positioned adjacent the front and rear traction wheels respectively and are selectively movable into engagement with the rails during travel of the draft vehicle thereon and out of engagement with the rails during highway travel of the draft vehicle.

7 Claims, 7 Drawing Figures

RAIL DRAFT VEHICLE

The present invention relates to draft vehicles and more particularly to such draft vehicles particularly adapted to move a train of rail cars over rails and to move highway loads on highways and at appropriate speeds.

As industrial sites are established further and further from major rail heads, railroad locomotive availability for timely switching and spotting of freight cars is becoming increasingly more costly and less reliable. Where productivity of plant operation is dependent upon timely movement of rail cars and/or semi-trailers to and away from loading and unloading platforms, a draft vehicle for moving a plurality of freight cars on rails and trailers on highways and in yards is particularly effective to increase the efficiency of plant operation.

The principal objects of the present invention are: to provide a draft vehicle which is particularly adapted for moving a plurality of rail cars on rails and trailers on highways and at plant sites; to provide such a draft vehicle specifically designed for use on rails and on highways wherein the weight of the vehicle is substantially equally distributed to all four traction wheels whereby the draft vehicle performs equally effectively in forward or reverse and particularly without additional weight from rail cars or a semi-trailer; to provide such a draft vehicle wherein front traction wheels are mounted by a resilient suspension system and rear traction wheels are mounted by a rigid suspension system thereby substantially eliminating harmonic vibration problems encountered in low speed railroad operations and to particularly provide improved road stability for moving a semi-trailer; to provide such a draft vehicle which takes advantage of the high coefficient of friction of rubber pneumatic tires on steel rails which is substantially greater than the coefficient of friction of steel tires or wheels on steel rails; to provide such a draft vehicle including metal rail guide wheels which are hydraulically held on the rails with substantially equal force at the front and rear thereof and wherein the hydraulic system is substantially balanced automatically to allow as much unit weight as possible to be transferred to the rails while still performing the guiding function; to provide such a draft vehicle having high ratio planetary axles designed for optimum pulling power while maintaining recommended engine speeds and having a differential which minimizes tire slippage on steel rails; to provide such a draft vehicle wherein the power train is designed to stallout if pulling power of the draft vehicle is exceeded thereby preventing damage to the driving and power components; to provide such a draft vehicle wherein the steering wheels have a steering lock-out operatively connected thereto for use when the steering wheels are in traction engagement with the steel rails; to provide such a draft vehicle having a substantially rigid frame and a generally planar deck or platform thereon wherein the draft vehicle may be used to transport loads independent of rail cars or a semi-trailer; to provide such a draft vehicle particularly adapted to have optional equipment mounted thereon, such as a fifth wheel for moving a semi-trailer, snow plow, sweeping broom, jib crane, winch and the like; to provide such a draft vehicle having flanged metal guide wheels engageable with the steel rails and which are adapted to provide stability and safety on uneven or debris-ladden rails and when passing over raised frogs, switch points, or the like; and to provide such a draft vehicle which is economical to manufacture, economical in operation, durable in construction, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include an exemplary embodiment of the present invention and illustrate various objects and features of the rail draft vehicle.

Figure 1:
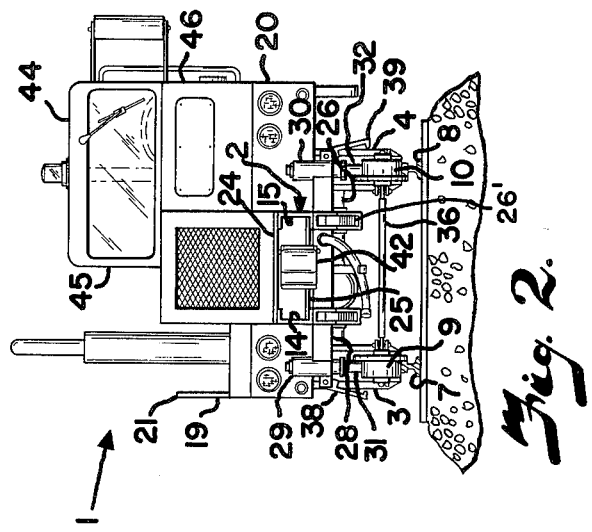
FIG. 1 is a side elevational view of a rail draft vehicle for moving a plurality of freight cars on rails and trailers on highways and embodying features of the present invention.
Figure 2:
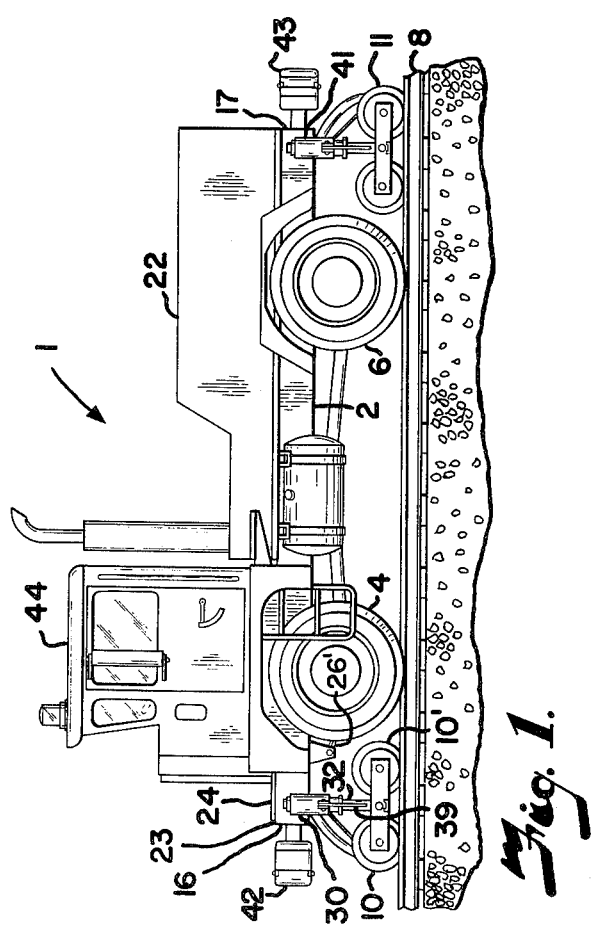
FIG. 2 is a front elevational view of the rail draft vehicle.
Figure 3:
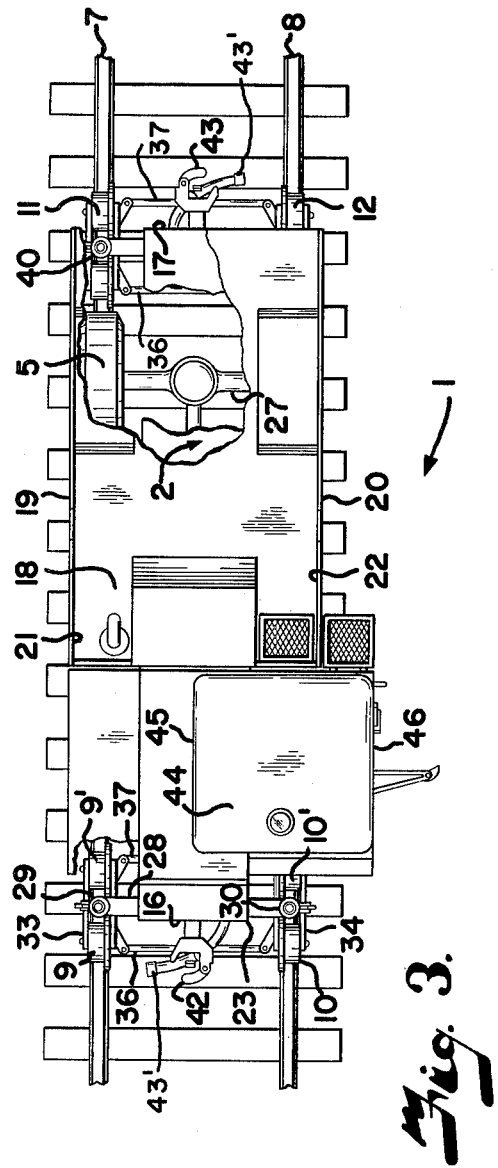
FIG. 3 is a plan view of the rail draft vehicle.

Referring more in detail to the drawings:

As required, detailed embodiments of the present invention are disclosed herein. However, it is to be understood that the disclosed embodiment are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

In the disclosed embodiment of the present invention, the reference numeral 1 generally designates a rail draft vehicle for moving a plurality of freight cars on rails and trailers on highways. The draft vehicle 1 includes a mobile vehicle and a frame 2 therefor and front pneumatic rubber tired traction wheels 3 and 4 and rear pneumatic rubber tired traction wheels 5 and 6 mounted on the frame 2 and operative to drive and steer the vehicle. The front traction wheels 3 and 4 and the rear traction wheels 5 and 6 are laterally spaced apart a distance suitable for traction engagement with a top portion of laterally spaced rails 7 and 8 respectively on which the draft vehicle 1 is to be operated. The front traction wheels 3 and 4 and the rear traction wheels 5 and 6 are longitudinally spaced apart and positioned such that the weight of the mobile vehicle is substantially equally supported on the front traction wheels 3 and 4 and the rear traction wheels 5 and 6. Front flanged metal guide wheels 9 and 10 and rear flanged metal guide wheels 11 and 12 are positioned adjacent the front traction wheels 3 and 4 and the rear traction wheels 5 and 6 respectively and the flanged metal guide wheels are selectively moveable into engagement with the rails 7 and 8 during travel on the rails and out of engagement with the rails 7 and 8 during highway travel of the draft vehicle 1.

The illustrated frame is a substantially rigid and heavy structure providing sufficient weight for traction of the rubber tired front wheels 3 and 4 and the rubber tired rear wheels 5 and 6 with the rails 7 and 8 and with a highway, plant yard, or other off-rail surface. The frame 2 includes laterally spaced elongated structural members 14 and 15 each extending between a front end 16 and a rear end 17 of the frame 2. The structural members 14 and 15 are illustrated as channel-shaped members formed of heavy material, such as ¾ inch plate. The channel shaped structural members 14 and 15 each have a depth of at least 10 inches to provide rigidity for the draft vehicle 1. The frame 2 includes a generally planar deck or platform 18 suitably secured to the structural members 14 and 15, as by welding, and extending laterally outwardly therefrom to define opposite side edges 19 and 20. The platform or deck 18 provides a cargo support area whereby the draft vehicle 1 may be employed as a truck for moving loads independent of rail cars, semi-trailer, and the like. The deck or platform 18 is formed of substantially rigid material, such as metal plates in the nature of at least 2 inches thick.

The cargo area of the frame 2 may be at least partially enclosed, as by side walls 21 and 22 secured to the platform or deck 18 and extending upwardly from the side edges 19 and 20 respectively. The deck 18 preferably includes wheel covers or fenders above and covering the front traction wheels 3 and 4 and the rear traction wheels 5 and 6. The fenders are preferably formed of substantially rigid material, such as metal plate at least ½ inch thick, which is secured to the deck and structural members 14 and 15, as by welding.

The illustrated frame 2 includes a front or forward extension 23 wherein the structural members 14 and 15 each extend forwardly beyond the front end 16 of the frame 2 and the front extension 23 includes upper and lower plates 24 and 25 respectively extending between and connected to the structural members 14 and 15 thereby providing a substantially rigid extension and defining a compartment, for a purpose later described.

The front traction wheels 3 and 4 and the rear traction wheels 5 and 6 are mounted on the frame 2 and are pneumatic tires. The front traction wheels 3 and 4 are laterally spaced apart and the rear traction wheels 5 and 6 are laterally spaced apart a distance suitable for traction engagement with a top portion of the rails 7 and 8 respectively on which the draft vehicle 1 is to be operated. The front traction wheels 3 and 4 are longitudinally spaced from the rear traction wheels 5 and 6 and positioned such that the weight of the mobile vehicle is substantially equally supported on the front traction wheels 3 and 4 and the rear traction wheels 5 and 6.

It has been found that pneumatic tires do take advantage of a higher coefficient of friction between rubber and steel than the coefficient of friction of metal to metal, such as metal rail wheels in engagement with steel rails. The pneumatic tires each have a substantially greater width than the rails engaged thereby so that side portions of the tires extend below the top of the rails and provide some lateral guiding of the draft vehicle.

The mobile vehicle includes suitable power means mounted on the frame 2 and operatively connectable to the front traction wheels 3 and 4 and to the rear traction wheels 5 and 6 for selectively driving same to move the draft vehicle 1 and a train of rail cars when coupled thereto or to move the draft vehicle and a semi-trailer when mounted thereon. The illustrated drive means includes a front axle 26 which includes suitable steering planetary drive gears operatively connected to the front traction wheel 3 and 4 and to an engine and transmission. The front axle 26 has an air operated front axle disengage or disconnect for road travel. The drive means includes a rear axle 27 operatively connected to the engine and transmission and having no-spin planetary drive gears operatively connected to the rear traction wheels 5 and 6 whereby the draft vehicle 1 has four-wheel drive through heavy-duty off-highway rated planetary drive axles.

The front axle 26 is mounted on the frame 2 by resilient suspension means, such as a plurality of full floating semi-elliptical leaf springs 26' and the rear axle 27 is mounted on the frame 2 by a substantially rigid suspension means or connection to thereby substantially eliminate harmonic vibrations particularly found in low speed railroad operations. The resilient suspension of the front axle 26 and the rigid suspension of the rear axle 27 also provides better road stability for pulling of a semi-trailer.

The draft vehicle 1 is particularly adapted for moving a plurality of rail cars on rails and a trailer on highways and the front traction wheels 3 and 4 are adapted to steer the draft vehicle 1 except when in traction engagement with the rails 7 and 8 respectively. The means for steering the front traction wheels 3 and 4 preferably includes hydrostatic power steering with manual over-ride or backup and steering lock-out when travelling on the rails 7 and 8 to thereby maintain the front traction wheels 3 and 4 in alignment with the rails 7 and 8 respectively on which the draft vehicle is to be operated.

The front guide wheels 9 and 10 are mounted on the frame 2 and positioned forward of the front traction wheels 3 and 4. The rear guide wheels 11 and 12 are mounted on the frame 2 and positioned rearwardly of the rear traction wheels 5 and 6 and the front and rear guide wheels engage the rails 7 and 8 to guide the draft vehicle 1 when the front and rear traction wheels are in traction engagement with the top portion of the rails 7 and 8. The front and rear guide wheels include flanged metal wheels each engaging respective rails for maintaining the traction wheels in engagement with the respective rails.

The front guide wheels 9 and 10 are mounted on the front extension 23 of the frame 2 and the illustrated mounting includes a support member 28 mounted on the front extension 23 and having portions extending laterally outwardly therefrom in each direction. Mounting members 29 and 30 are supported on respective portions of the support member 28 and positioned substantially in alignment with the side edges 19 and 20 respectively of the frame 2. The mounting members 29 and 30 each receive and support suitably extensible members having air over hydraulic suspension to provide maximum reaction to adverse track conditions. The extensible members have depending shafts or rods 31 and 32 respectively and the shafts or rods 31 and 32 have equalizer beams 33 and 34 respectively pivotally mounted on the lower ends thereof. In the illustrated structure, the front guide wheels 9 include a leading guide wheel 9 and a trailing guide wheel 9' rotatably mounted on respective opposite ends of the equalizer beam 33. The front guide wheels 10 include a leading guide wheel 10 and a trailing guide wheel 10' mounted on respective opposite ends of the equalizer beam 34.

Suitable leading and trailing tie-rods 36 and 37 respectively extend between leading and trailing ends of the equalizer beams 33 and 34 to thereby coordinate the movement of the front guide wheels 9 and 10 as a unit.

The draft vehicle 1 includes means mounted on the frame 2 and operatively connected to the front and rear guide wheels 9 and 10 for selectively moving the metal wheels thereof into and out of guiding engagement with the rails 7 and 8 respectively. In the illustrated embodiment, the extensible members and the rods 31 and 32 are suitably controlled from a cab, as later described, for raising and lowering the equalizer beams 33 and 34 and thereby raising and lowering the front guide unit.

When the front guide wheels 9 and 10 are in the raised position and out of guiding engagement with the rails 7 and 8, it is desirable that the guide wheels be maintained in the raised position particularly during highway travel. Therefore, suitable hooks 38 and 39 are pivotally mounted on the mounting members 29 and 30 and are selectively moveable into and out of a position engaging and retaining the equalizer beams 33 and 34 respectively to thereby hold the front guide unit in a raised position.

The rear guide unit including the rear guide wheels 11 and 12 is constructed substantially similar to the front guide unit except that support members 40 and 41 are suitably secured to the structural members 14 and 15 respectively, as by bolting, and extend laterally outwardly therefrom to receive suitable mounting members thereon which support respective extensible members each having a depending rod with an equalizer beam pivotally mounted thereon. The rear guide unit also includes leading and trailing tie rods 36 and 37 extending between respective leading and trailing metal wheels.

Figure 5:
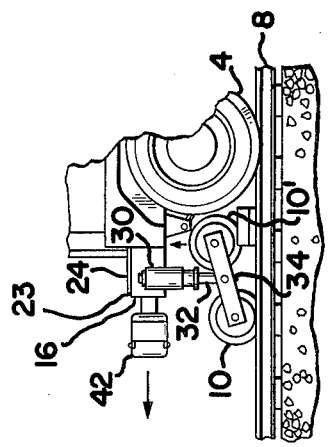
FIG. 5 is a fragmentary side elevational view of the guide wheels passing over the obstruction.
Figure 7:
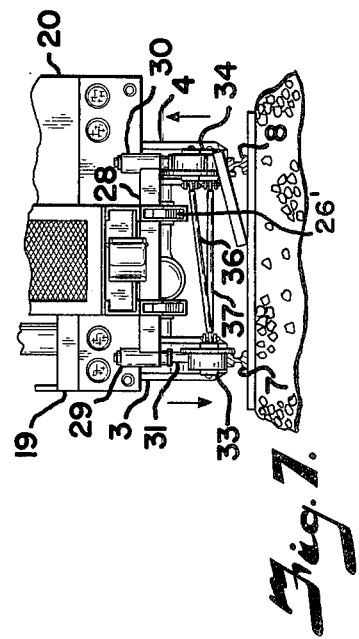
FIG. 7 is a fragmentary front elevational view of the draft vehicle and showing a guide wheel passing over the obstruction.
Figure 4:
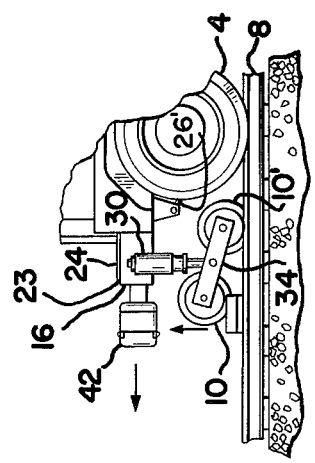
FIG. 4 is a fragmentary side elevational view of flanged metal guide wheels engaging an obstruction on the rails.
Figure 6:
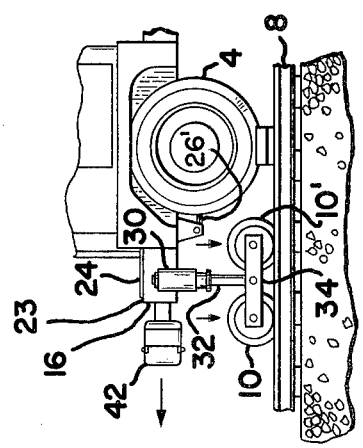
FIG. 6 is a fragmentary side elevational view of a traction wheel passing over the obstruction.

The draft vehicle 1 includes means operatively connected to the front guide unit and to the rear guide unit to absorb shock of an obstruction on the rails and to maintain the flanged metal wheels of the front guide unit and the rear guide unit in engagement with the rails in the event of vertical spacing between adjacent metal wheels and pneumatic tires as effected by an obstruction on the rails. As best seen in FIGS. 4 to 7 inclusive, as a leading rail guide wheel approaches and engages an obstruction, the air cushion of the air over hydraulic suspension absorbs the initial shock and the respective equalizer beam allows the leading rail guide wheel to raise. The adjacent pneumatic drive or traction tire remains fully engaged with the respective rail since the suspension systems for the traction or drive wheels and the guide wheels are completely independent.

Beyond the flexing limits of the air cushion, vertical movement of the rail guide wheel is controlled by overcoming a pre-set hydraulic pressure on the respective extensible member thereby allowing the piston of the respective extensible member to travel upwardly until clearing the obstacle or obstruction by the trailing guide wheel. The adjacent pneumatic traction wheel continues to maintain full traction contact with the respective rail.

As the pneumatic traction wheel rides up and over the obstruction, the controlled downward hydraulic force assures constant guide wheel engagement with the rail. Vehicle traction is maintained through controlled no-spin differentials.

The tie-rods have suitable joints to permit the four rail guide wheels of the respective front and rear guide unit to react independently. The extensible members connected to the equalizer beams have suitable controls whereby the extensible members are automatic and self-leveling and have constant equalized pressure regardless of rail guide wheel attitude or position.

The draft vehicle 1 includes means mounted on the frame 2 adjacent the front and rear ends 16 and 17 of the frame 2 for coupling and connecting to and end rail car of a train of rail cars. In the illustrated structure, front and rear couplers 42 and 43 are mounted on the frame and positioned between the structural members 14 and 15 and the couplers each are equipped with automatic mechanical latching and air-operated unlatching. The front coupler 42 is positioned within the compartment defined by the structural members 14 and 15 and the upper and lower plates 24 and 25. The rear coupler 43 is positioned between the structural members 14 and 15 and is suitably supported as by a lower plate. Suitable rail car air brake hoses 43' are mounted adjacent the front and rear ends 16 and 17 respectively of the frame 2 for operating rail car brakes from inside an operator's cab on the rail draft vehicle.

The draft vehicle 1 includes an operator's cab 44. The illustrated operator's cab 44 has a longitudinal axis laterally spaced from the longitudinal axis of the frame 2 and includes opposite sides 45 and 46 with a suitable door in one side, as in side 45. One of the sides is spaced laterally outwardly from an adjacent side edge of the deck or platform 18 to thereby provide visibility beyond the one side edge of the deck or platform 18. The operator's cab 44 is positioned above the front axle 26 and the weight of the operator's cab 44 is positioned such that the load on the front traction wheels 3 and 4 is substantially equal to the load on the rear traction wheels 5 and 6.

The draft vehicle 1 is particularly adapted to have optional equipment mounted thereon, such as a fifth wheel for use during pulling and spotting of a semi-trailer. Plant maintenance equipment, such as a snow plow, winch, and rotary broom may be mounted on the forward or front end 16 of the frame 2 for use at an industrial plant site. A jib crane may be mounted on the platform or deck 18 for handling various materials, loading, unloading, holding and moving same.

The operator's cab 44 has suitable controls therein for engaging or disengaging the steering of the front traction wheels 3 and 4 and for raising and lowering the front and rear guide wheels. When selected optional equipment is used on the draft vehicle, such equipment may be controlled by an operator in the cab 44.

The draft vehicle 1 is a heavy duty vehicle and examples of components thereof are provided for illustration. The power means provide a load capacity in the nature of 1,300 tons on level and maintained rails and in the nature of 10 tons for a fifth wheel tongue weight. The engine is preferably extra-heavy duty industrial rated and the transmission is full power shift with torque converter and vibration dampener. The transmission has equal speeds forward and reverse for both rail and road operation.

The traction wheels are each adapted to support a load in the nature of 5,600 pounds or more and the traction wheels are four 12.00 by 22.5, 12PR tubeless tires on drop center rims and solid disc wheels. Duplex rear tires are mounted on the rear axle 27 when the draft vehicle 1 is equipped with a fifth wheel for moving and spotting a semi-trailer.

The engine, transmission, deck or platform, frame, front and rear axles and the traction wheels thereon, front and rear flanged guide wheels are all arranged for a weight distribution that is substantially equal on all traction wheels for maximum traction for moving rail cars and a trailer on respective paths.

The draft vehicle 1 has a weight in the nature of 22,400 pounds before optional equipment is mounted on the vehicle. The weight of the vehicle is substantially equally transferred to the front axle and the rear axle whereby each traction wheel has maximum traction for moving the respective load.

It is to be understood that while we have illustrated and described one form of our invention, it is not to be limited to the specific form or arrangement of parts herein described and shown.

What We claim and desire to secure by Letters Patent is:

1. A draft vehicle for moving freight cars on rails and a trailer on highways, said draft vehicle comprising:
   a. a mobile draft vehicle and a frame therefor having opposite ends, said frame on said mobile draft vehicle having a longitudinal axis and opposed side edges;
   b. front and rear traction wheels supporting said mobile draft vehicle, certain of said traction wheels being laterally spaced apart a distance corresponding to the spacing of rails on which the draft vehicle is to be operated;
   c. power means mounted on said vehicle and selectively connectable to said rear wheels to drive said rear wheels and to said front and rear wheels to drive said front and rear wheels to propel the vehicle selectively forwardly and rearwardly;
   d. a platform on the frame of said vehicle and having opposite side edges and a mass substantially evenly distributed between said front and rear traction wheels, said platform and frame and power means being arranged for a weight distribution that is substantially equal on all traction wheels for maximum traction for moving rail cars and trailers on respective paths;
   e. front and rear flanged guide wheels mounted on said frame and positioned adjacent said front and rear traction wheels respectively for engaging the rails to guide said draft vehicle when said front and rear traction wheels are in traction engagement with the rails;
   f. means mounted on said frame and operatively connected to said front and rear guide wheels for selectively moving same into and out of engagement with the rails;
   g. means mounted on said frame adjacent each of the opposite ends of said frame for coupling and connecting to an end rail car of a train of rail cars to be moved by said draft vehicle;
   h. said mobile draft vehicle including an operator's cab positioned above said front traction wheels and offset laterally from the longitudinal axis of said frame; and
   i. said operator's cab having one side thereof spaced laterally outwardly from one side edge of said frame to thereby provide visibility beyond the one side edge of said frame and a respective one of the opposite edges of said platform.

2. A draft vehicle for moving freight cars on rails and a trailer on highways, said draft vehicle comprising:
   a. a mobile draft vehicle and a frame therefor having opposite sides and ends, said frame of said mobile draft vehicle having a longitudinal axis and opposed side edges;
   b. front traction wheels and rear traction wheels mounted on said frame for supporting said mobile draft vehicle, the wheels of said front traction wheels and the wheels of said rear traction wheels being pneumatic tires and laterally spaced apart a distance corresponding to the spacing of rails for traction engagement with laterally spaced rails on which said draft vehicle is to be operated, said front traction wheels being longitudinally spaced from said rear traction wheels such that the weight of said draft vehicle is substantially equally supported on said front traction wheels and said rear traction wheels, said front traction wheels being mounted on said frame by resilient suspension means;
   c. said front traction wheels having means operatively connected to same for steering said front traction wheels when said mobile draft vehicle is travelling off the rails;
   d. said means for steering said front traction wheels having means operatively connected thereto to selectively lockout same when said front wheels are in traction engagement with the rails to thereby maintain said front traction wheels in alignment with the rails;
   e. said rear traction wheels being mounted on said frame by a substantially rigid suspension means to thereby substantially eliminate harmonic vibrations in said mobile draft vehicle when travelling on the rails;
   f. power means mounted on said mobile draft vehicle and selectively connectable to said rear wheels and to said front and rear wheels to drive said front and rear wheels to propel said mobile draft vehicle selectively forwardly and rearwardly;
   g. a platform on the frame of said mobile draft vehicle and having opposite side edges and a mass substantially evenly distributed between said front and rear traction wheels, said platform and said power means being arranged for a weight distribution that is substantially equal on all traction wheels for maximum traction for moving rail cars and a trailer on respective paths;
   h. front and rear flanged metal guide wheels mounted on said frame and positioned adjacent said front and rear traction wheels respectively for engaging the rails to guide said mobile draft vehicle when said front traction wheels and said rear traction wheels are in traction engagement with the rails;
   i. means mounted on said frame and operatively connected to said front and rear metal guide wheels for selectively moving the metal wheels thereof into and out of guiding engagement with the rails;
   j. means operatively connected to each of said front and rear guide wheels to absorb shock of an obstruction on the rails and to maintain the metal wheels of said front and rear guide wheels in engagement with the rails in the event of vertical spacing between adjacent metal wheels and pneumatic tires effected by an obstruction on the rails;

k. means mounted on said frame and positioned adjacent each of the opposite ends of said frame for coupling and connecting to an end rail car of a train of rail cars to be moved by said draft vehicle;

l. said mobile draft vehicle including an operator's cab positioned above said front traction wheels and offset laterally from the longitudinal axis of said frame; and m. said operator's cab having one side thereof spaced laterally outwardly from one side edge of said frame to thereby provide visibility beyond the one side edge of said frame and a respective one of the opposite edges of said platform.

3. A draft vehicle for moving freight cars on rails and a trailer on highways, said draft vehicle comprising:

a. a mobile draft vehicle and a frame therefor having front and rear ends;

b. front and rear axles adjacent said front and rear ends respectively, said frame being mounted on said front axle by resilient suspension means and mounted on said rear axle by substantially rigid suspension means;

c. pneumatic rubber tired traction wheels on the front and rear axles with a lateral spacing corresponding to the spacing of rails on which the draft vehicle is to be operated for centering of each wheel on a respective rail;

d. power means mounted on said vehicle and selectively connectable to said rear wheels to drive said rear wheels and to said front and rear wheels to drive said front and rear wheels to propel the vehicle selectively forwardly and rearwardly;

e. a platform on the frame of said vehicle and having opposite side edges and a mass substantially evenly distributed between said front and rear traction wheels, said platform and frame and power means being arranged for a weight distribution that is substantially equal on all traction wheels for maximum traction for moving rail cars and trailers on respective paths;

f. front and rear flanged guide wheels mounted on said frame and positioned adjacent said front and rear traction wheels respectively for engaging the rails to guide said draft vehicle when said front and rear traction wheels are in traction engagement with the rails;

g. means mounted on said frame and operatively connected to said front and rear guide wheels for selectively moving same into and out of engagement with the rails and maintaining guiding engagement when said guide wheels are engaged with the rails;

h. means mounted on said frame adjacent each of the front and rear ends of said frame for coupling and connecting to an end rail car of a train of rail cars to be moved by said draft vehicle;

i. said front and rear axle suspensions and guide wheel moving means accommodating uneven rails and maintaining traction engagement of all of the front and rear traction wheels and guiding engagement of front and rear guide wheels with said rails.

4. A draft vehicle as set forth in claim 3 wherein:

a. said coupling means at each of the front and rear ends provides for connecting rail cars at either end for movement in either direction;

b. said resilient suspension of the front axle and substantially rigid suspension of the rear axle on said frame provides traction wheel rail engagement that substantially eliminates harmonic vibrations in said mobile draft vehicle when pulling and pushing rail cars at either end in either direction on the rails.

5. A draft vehicle as set forth in claim 4 wherein:

a. said frame being of heavy structural members having a depth in the nature of 10 inches and wall thickness in the nature of ¾ inches;

b. said platform being a metal plate of a thickness in the nature of two inches, said frame, platform, power means being arranged for substantially uniform weight distribution on the traction wheels with said draft vehicle providing a load on each of said wheels in the nature of at least 5,600 pounds;

c. said coupling means at the front and rear of the frame providing a connection to rail cars to be moved for applying linear force thereto for pulling and pushing same with the weight of said draft vehicle providing all of the load on the traction wheels.

6. A draft vehicle as set forth in claim 5 including means operatively connected to each of said front and rear guide wheels to absorb shock of an obstruction on the rails and to maintain said front and rear guide wheels in engagement with the rails in the event of vertical spacing between adjacent guide wheels and traction wheels effected by an obstruction on the rails.

7. A draft vehicle as set forth in claim 6 wherein:

a. said front traction wheels have hydrostatic power means operatively connected to same for steering said front traction wheels when said mobile draft vehicle is travelling off the rails; and b. said hydrostatic power means for steering said front traction wheels has hydraulic means operatively connected thereto to selectively lock-out same when said front wheels are in traction engagement with the rails.

* * * * *